United States Patent Office 3,577,388
Patented May 4, 1971

---

3,577,388
FIBER PREPARED FROM POLYESTER BASED POLYURETHANE PREPOLYMER
Ignazio Salvatore Megna and Anthony Koroscil, Somerville, N.J., assignors to American Cyanamid Company, Stamford, Conn.
No Drawing. Continuation-in-part of application Ser. No. 566,229, July 19, 1966. This application May 14, 1969, Ser. No. 824,685
Int. Cl. C08g 22/10, 22/16
U.S. Cl. 260—75                                        2 Claims

ABSTRACT OF THE DISCLOSURE

Polyurethane spinning solutions which yield spandex fibers of improved elasticity are prepared by reacting an excess of an organic diisocyanate with a hydroxyl terminated polyester prepared by reacting adipic acid with an excess of a mixture of 1,4-butylene glycol and 1,2-propylene glycol wherein the glycols are present in a mole ratio of between 80:20 and 95:5, and then chain extending the resulting prepolymer with a diamine.

---

This application is a continuation-in-part of application Ser. No. 566,229, filed July 19, 1966, now abandoned.

The present invention relates to a new method for the preparation of a polyester-based, isocyanate-terminated polyurethane prepolymer. The invention further is concerned with the new and improved prepolymer composition obtained as a result of the operation of this process. In particular the invention in one aspect of commercial application is concerned with the manufacture of a spandex or polyurethane fiber prepared by further treatment of the prepolymer solution to obtain a fibrous material having unexpectedly beneficial elastic recovery properties.

It is an object of the present invention therefore to disclose to the art a unique polyurethane spinning solution for the manufacture of an isocyanate-terminated polyurethane fiber having superior elastic properties as compared with analogous materials previously known to the art and presently in commercial use. Other objects more specific in nature would involve the method for the manufacture of such improved fibers as well as the production of a unique intermediary prepolymer solution. These and other more specific objects and purposes of the invention will become self-evident upon a review of the following specification of our invention.

BACKGROUND OF THE INVENTION

The advance in the state of the art provided by our improved product can be more deeply appreciated when one considers the general state of the art prior to the time of our discovery. It is not our intention to maintain that we have discovered the first isocyanate-terminated polyurethane spinning solution and/or the fibrous material spun therefrom, but rather that we have discovered a new and improved fibrous polyurethane product of the polyurethane type which is based on a unique prepolymer and spinning solution derived therefrom yields a fiber which ultimately possesses certain totally unexpected improvements in elastic recovery properties. The capacity of elastic items manufactured therefrom to "snap back" is extremely critical to the commercial success of the product and often means the difference between success and failure for the item being marketed.

The disclosure of U.S. Pat. No. 2,729,618 teaches the preparation of a polyester which is modified by reaction with a diisocyanate. This polyester is prepared from, for example, adipic acid and 1,2-propylene glycol as is set forth in Example 5. However, as will be demonstrated in the test data presented with our examples, the method and product obtained therefrom based on the practice of this particular patent would give one a product which is wholly unsuitable for application in fiber manufacture because of its failure to exhibit sufficiently good elastic recovery properties. Therefore, it is the specific purpose of the present invention to devise a polymer product which forms a spandex fiber having all of the advantages and none of the disadvantages of the polymer products of the prior art. A similar U.S. Patent 2,621,166 provides elastomeric polyester polyurethanes which are elastomeric polyesters which are particularly characterized as having good storage stability. While Example 6 of this patent shows a mixture of ethylene glycol-adipic acid polyester and propylene glycoladipic acid polyester to give a shelf-stable thermoplastic-reaction product, there is no appreciation of the notion that a copolymer formed by reacting 1,2-propylene glycol and certain other specific glycols with adipic acid and subsequently chain extending this material with a suitable diamine would ultimately result in a filamentous polyurethane fiber having drastic and unexpected improvements in its recovery rate following elastic extension. It is in this particular framework that the improvement which constitutes applicants' invention was born and, in the face of such knowledge, that a discovery was made.

Frequently employed throughout the general description of this specification one will find the term "elastic recovery." When we employ this term, we are referring to the recovery of a polyurethane fiber to its original dimensions within a measurable period of time after the application of a stretch or strain. An unsatisfactory elastic recovery would be demonstrated by the fiber's high permanent set value and collaterally its poor retention of modulus after repeated stretching even with a short recovery period permitted between each stretching. By way of illustration of this definition the no load recovery of elongation (NLRE) after different cycles would be 100 percent or a fiber would recover to zero elongation after repeated stretching to 300% for a perfect or ideal spandex fiber. For those polyester-based fibers which exhibit slow recovery, the NLRE is an elongation value generally 75 to 85% of the load elongation, e.g., if the fiber is for example loaded to an elongation of 300% the NLRE is about 215 to 255% which indicates that these fibers would have a relatively poor recovery after stretching to the high degree indicated.

The inability of some polyester-based polyurethane fibers to recover their original dimensions a short time after elongation may be due to a number of different phenomena associated with polyester structure. One of these phenomena is the formation of relatively high melting ordered segments which result after elongation. These ordered segments can be compared to those ordered segments which result on drawing hard fibers such as polyethylene, terephthalate and nylon. As it is well known these hard fibers are known to crystallize and set when drawn. This knowledge is based on the change in refraction index which we observe as well defined regions of X-ray diffraction. For example, X-ray diagrams of spandex fibers which are known to have poor elastic recovery due to their construction show upon examination crystalline X-ray diagrams in the relaxed state as well as on elongation. The crystallinity in these fibers is believed due to orderly three dimensional packing of these polyesters which become strong tie points in the fiber upon elongation and thus prevent the fiber from recovering its original length. The present invention is concerned with the complete elimination of this problem by presentation of a critical polyester prepolymer. In any event a polyester-based polyurethane prepolymer has now been discovered which can be chain extended by known techniques to form polyurethane solutions from which spandex fibers having excellent elastic recovery properties can be spun.

THE INVENTION

Accordingly, the key to the success of this invention is based on the discovery and use in the prepolymer stage of a specific polyester; namely, the material poly(butylene-propylene adipate) which ester is reacted with an isocyanate to terminate the same. This product by subsequent chain extension eventually will form the fibrous product having unexpectedly beneficial fiber recovery capacity. The specific polyester involved herein is a random copolyester prepared by reacting an excess of a mixture of 1,4-butylene glycol and 1,2-propylene glycol with adipic acid. The unexpected use aspect of this particular polyester composition may be comparatively illustrated if one considers the inferior elastic recovery properties of presently available spandex prepared from a polyester prepolymer solution in which the glycol component is entirely poly(1,4-butylene adipate) and compares this with a fiber prepared from our new prepolymer. Moreover, it is truly amazing to note that the improved results of our invention cannot be obtained by substituting a mere mixture of polybutylene adipate and polypropylene adipate for the copolyester as was in effect suggested by the prior art Pat. 2,621,166 cited earlier.

The molar ratio of the glycol reactant 1,4-butylene glycol to the glycol reactant 1,2-propylene glycol ranges between 80:20 and 95:5 and is preferably about 90:10. The ratio of mixed glycols to adipic acid generally stated should be such as to produce the desired molecular weight. The desired molecular weight of this copolyester should be between about 700 and 5,000 and preferably about 1,500 to 3,000. The hydroxyl number should be between about 22 to 160.

The diisocyanate which is reacted with the polyester glycol to yield the prepolymer may be either aromatic, aliphatic, or cycloaliphatic. Aromatic diisocyanates, by which we mean diisocyanates in which the isocyanate groups are directly attached to aromatic ring structures, are generally preferred because of their higher reaction rates. Examples of some acceptable diisocyanates are 2,4-tolylene diisocyanate, p-phenylene diisocyanate, methylene bis(4-phenyl isocyanate), 1,6-hexamethylene diisocyanate, 1,4-cyclohexylene diisocyanate and mixtures thereof. The preferred isocyanate for use in our invention, however, is methylenebis(4-phenyl isocyanate).

The precise amount of diisocyanate reacted with the polyester glycol is selected generally on the basis of the particular reactants used as well as the desired end product. In most instances, however, between 1.5 and 2.5 isocyanate groups should be present for reaction with each active hydrogen of the polyester glycol.

A typical prepolymer is prepared by adjusting an essentially bifunctional poly(butylene-propylene adipate) glycol having a molecular weight of about 2,000 to a moisture content of 0.05% and reacting the adjusted polyester glycol with 100% molar excess of methylenebis(4-phenyl isocyanate). Reaction is carried out at about 100° C. for about one hour. A conventional polyurethane solvent, such as dimethylformamide, dimethylacetamide, or dimethylsulfoxide is used in the reaction of the prepolymer with the chain extender.

In general, the process of chain extension is more easily carried out when a portion of the solvent is admixed with the prepolymer prior to initiation of chain extension. This tends to reduce the viscosity of the prepolymer and facilitates mixing and transfer of the prepolymer solution. The isocyanate terminated prepolymer may be slowly added to the chain extender in a solvent or the chain extender may be added to the prepolymer in a solvent, but it is preferred to add the prepolymer to the chain extender dissolved in a solvent. Suitable chain extenders capable of use in our synthesis include various diamines such as hydrazine, substituted hydrazines, ethylenediamine, 1,2-propanediamine, 1,3-propanediamine, 1,4-butanediamine, 1,5-pentanediamine, 1,6-hexanediamine, N-aminoethylethanolamine, 1,3-diamino-2-propanol, methyliminobispropylamine, piperazine, substituted piperazines, diaminopiperazine, and substituted diaminopiperazines, cycloaliphatic diamines, and various sterically hindered diamines or mixtures thereof. It is advantageous to use a mixture of a major portion of ethylenediamine and a minor portion of methyliminobispropylamine.

About a stoichiometric amount of amine chain extender is used. When more than one chain extender is used, the prepolymer may be reacted with the mixed chain extenders, or first with one extender and then with another. In carrying out the chain extension it is advantageous to use carbon dioxide adducts of the diamines as described in copending application Ser. No. 533,863, filed Mar. 14, 1966.

A chain terminating compound containing only one secondary or primary amine group may be used in the manner known in the art to control polymer solution quality. Such a compound may be added with the chain extender, but should not be present in an amount in excess of 5 mole percent of the total chain extender used. In most cases optimum concentration of such a compound is less than 4 mole percent. Examples of useful compounds are: dimethylamine, diethylamine, diethanolamine, N,N-dimethyl-1,3-propanediamine.

This polymer solution may then be wet or dry spun by conventional techniques to give an elastomeric filament having improved elastic recovery properties or may be used to form other shaped articles, such as films or castings.

Dyes, pigments, antioxidants, stabilizers and other additives may be incorporated in the polyurethane by addition at any stage before formation of the shaped article, but are preferably added to the polymer solution after the chain extension step. If any such compound is to be added prior to the chain extension step, it must be essentially inert to isocyanate and active hydrogen.

The invention is further illustrated by the examples which follow. All parts and percentages are by weight unless otherwise indicated.

Example 1

(A) Prepolymer preparation.—A mixture of 340 parts of a hydroxyl-terminated copolyester, prepared from adipic acid and an excess of a 90:10 molar mixture of 1,4-butylene glycol and 1,2-propylene glycol and having a hydroxyl number of 62, and 100 parts of methylene-bis-(4-phenyl isocyanate) is heated at 90–95° C. for about 45 minutes. The prepolymer has a free-isocyanate content of about 3.53%. The reaction mixture is cooled to 70° C. and 147 parts of dimethylformamide is added.

(B) Chain extension.—300 parts of pulverized Dry Ice (solid carbon dioxide) is added to 4,750 parts of dimethylformamide with vigorous agitation, immediately followed by (1) a solution of 6.3 parts of methyliminobispropylamine and 24.3 parts of ethylenediamine in 380 parts of dimethylformamide, and (2) 0.795 part of diethanolamine. The diluted prepolymer solution is then added gradually (about 15 minutes) with vigorous agitation until a viscosity of about 10,000 cps. is obtained. The resulting polyurethane solution is spun into spandex fibers as described in Example 4.

Example 2

(A) Prepolymer preparation.—The procedure of Example 1 is followed substituting 400 parts of hydroxy terminated poly(1,4-butylene adipate) having a hydroxyl number of 56 for the copolyester used therein.

(B) Chain extension.—The procedure of Example 1 is followed. The resulting solution of polyurethane is spun into fibers as described in Example 4.

Example 3

(A) Prepolymer preparation.—The procedure of Example 1 is followed substituting 370 parts hydroxy-terminated copolyester (OH=60) prepared from adipic acid and an excess of a 90:10 molar mixture of 1,4-butylene glycol and 2,2-dimethyl-1,3-propylene glycol for the copolyester used therein.

(B) Chain extension.—The procedure of Example 1 is followed. The resulting solution of polyurethane is spun into fibers as described in Example 4.

Example 4

Filament spinning.—To each of the chain extended polymer solutions of Examples 1, 2 and 3 there is added a mixture of 60 parts of titanium dioxide, 60 parts of dimethylformamide and 14.5 parts of 4,4'-butylidenebis(6-tert.-butyl-m-cresol), an antioxidant.

The pigmented polymer solutions are forced at constant speed by means of a precision gear pump through a spinnerette immersed in water, the spinnerette having 20 holes of 0.010" diameter. The extruded, semiplastic monofilaments are brought together to form a single coalesced multifilament fiber which is padded through a series of baths to extract the dimethylformamide by countercurrent washing with water. The wet fiber is then continuously dried and cured on a belt dryer and finally wound on spools. The fibers have approximately the same denier.

The "permanent set" values for the fibers are determined by holding the fibers at 200% extension at a given temperature for a given length of time. The percent difference between the original length of the fiber and the length after release is determined. Low percentages are desirable.

The "elastic recovery" values are determined by stretching the fiber 300% for five times with a 1-minute relaxation period between each stretching on an IP-2 Scott Tester. The original and final lengths of the fiber are compared. Rapid recovery of the fiber is determined qualitatively by the slope of this cycling curve.

The results of the test are shown in Table I.

TABLE I.—PERMANENT SET

| Example: | 24 hr. at 23° C., percent | 10 min. at 93° C., percent | Elastic recovery |
|---|---|---|---|
| 1 | 6 | 27 | Fast. |
| 2 | 105 | 111 | Slow. |
| 3 | 23 | 52 | Do. |

These results show that the desirable elastic recovery properties of the product of this invention (product of Example 1) are not obtained by (1) the use of poly(1,4-butylene adipate) or (2) the use of a copolyester from adipic acid with 1,4-butylene glycol and a second glycol other than 1,2-propylene glycol.

We claim:
1. A polyurethane fiber of improved elasticity which is prepared from a spinning solution which in turn is prepared by a process which comprises
   (a) reacting a molar excess of methylene bis(4-phenylisocyanate) with a copolyester reaction product of adipic acid with an excess of a mixture of 1,4-butylene glycol and 1,2-propylene glycol to form an isocyanate terminated prepolymer, wherein the ratio of glycols in said mixtures ranges between 80:20 and 95:5, respectively, and the molecular weight and hydroxyl number of said copolyester are between about 700 to 5,000 and 22 to 160, respectively, and
   (b) chain extending the aforesaid prepolymer in the presence of a solvent by reaction with a stoichiometric amount of a mixture comprising a major amount of ethylene diamine and a minor amount of methyl imino bispropylamine.
2. The fiber according to claim 1 wherein the ratio of glycols in step (a) is about 90:10.

References Cited

UNITED STATES PATENTS

| | | | |
|---|---|---|---|
| 2,929,804 | 3/1960 | Steuber | 260—77.5 |
| 3,094,510 | 6/1963 | Parker et al. | 260—75 |
| 3,180,853 | 4/1965 | Peters | 260—77.5 |
| 3,180,854 | 4/1965 | Schneider | 260—77.5 |
| 3,357,954 | 12/1967 | Kirkaldy | 260—75 |

DONALD E. CZAJA, Primary Examiner

H. S. COCKERAM, Assistant Examiner

U.S. Cl. X.R.

260—77.5